US012775956B2

(12) United States Patent
Liu et al.

(10) Patent No.: US 12,775,956 B2
(45) Date of Patent: Oct. 27, 2026

(54) GREENHOUSE ENVIRONMENT CONTROL BASED ON SUPPLY CHAIN IoT ANALYSIS

(71) Applicant: INTERNATIONAL BUSINESS MACHINES CORPORATION, Armonk, NY (US)

(72) Inventors: Su Liu, Austin, TX (US); Syed I. Haiderzaidi, Round Rock, TX (US); Paul Llamas Virgen, Guadalajara (MX); Demetrice L Browder, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 18/128,339

(22) Filed: Mar. 30, 2023

(65) Prior Publication Data

US 2024/0330949 A1 Oct. 3, 2024

(51) Int. Cl.

*G06Q 30/00* (2023.01)
*G06Q 30/018* (2023.01)
*G06Q 30/0202* (2023.01)

(52) U.S. Cl.

CPC ....... *G06Q 30/018* (2013.01); *G06Q 30/0202* (2013.01)

(58) Field of Classification Search

CPC ......................... G06Q 30/018; G06Q 30/0202
See application file for complete search history.

(56) References Cited

U.S. PATENT DOCUMENTS

| | | | |
|---|---|---|---|
| 6,842,719 B1 | 1/2005 | Fitzpatrick et al. | |
| 7,080,026 B2 | 7/2006 | Singh et al. | |

(Continued)

FOREIGN PATENT DOCUMENTS

| | | | |
|---|---|---|---|
| CN | 203433329 U | 2/2014 | |
| WO | 2016073025 | 5/2016 | |
| WO | WO-2022015866 A1 * | 1/2022 | ............... A01C 1/02 |

OTHER PUBLICATIONS

Upadhyay et al., Economic Evaluation Of Seeding Decisions In Hybrid And Open-Pollinated Herbicide-Resistant Canola, https://cdnsciencepub.com/doi/pdf/10.4141/P04-135, Canadian journal of plant science (Year: 2005).*

(Continued)

*Primary Examiner* — Uche Byrd
(74) *Attorney, Agent, or Firm* — Seed Intellectual Property Law Group LLP

(57) ABSTRACT

A method, computer program product, and a system are configured to: detect sensors in an Internet-of-Things (IoT) network of a supply chain of fresh produce; collect data from the detected sensors via the IoT network; determine a demand of a type of produce at a future date using the collected data and a forecasting model; determine a change to an output of a greenhouse growing the type of produce based on the determined demand for the type of produce; determine a growing plan for the greenhouse based on the determined change to the output of the greenhouse; adjust one or more growing environment conditions in the greenhouse based on the growing plan, wherein the adjusting includes sending control signals to one or more computer-based environment control systems in the greenhouse, and wherein the adjusting changes a maturity time of a batch of the type of produce growing the greenhouse.

17 Claims, 5 Drawing Sheets

(56) References Cited

U.S. PATENT DOCUMENTS

| | | | | |
|---|---|---|---|---|
| 7,966,211 | B2 | 6/2011 | Dogan et al. | |
| 8,643,495 | B2 | 2/2014 | Lan et al. | |
| 10,728,336 | B2 | 7/2020 | Akhtar | |
| 11,116,125 | B2 | 9/2021 | Murphy | |
| 11,195,015 | B2 | 12/2021 | Tran et al. | |
| 11,272,681 | B2 | 3/2022 | Carta | |
| 11,295,324 | B2 | 4/2022 | Morgan et al. | |
| 11,410,249 | B2 | 8/2022 | Prendergast, Jr. | |
| 2004/0088211 | A1 | 5/2004 | Kakouros et al. | |
| 2005/0102175 | A1* | 5/2005 | Dudat | G06Q 10/04 705/7.31 |
| 2010/0138273 | A1 | 6/2010 | Bateni et al. | |
| 2010/0306012 | A1* | 12/2010 | Zyskowski | G06Q 10/06 705/7.36 |
| 2011/0004510 | A1 | 1/2011 | Bateni et al. | |
| 2016/0212948 | A1 | 7/2016 | McGuire | |
| 2018/0152391 | A1 | 5/2018 | Huh et al. | |
| 2020/0134640 | A1 | 4/2020 | Morgan et al. | |
| 2020/0134641 | A1* | 4/2020 | Morgan | G06Q 30/0202 |
| 2020/0134741 | A1* | 4/2020 | Bongartz | A01G 31/042 |
| 2021/0326723 | A1 | 10/2021 | Kumar et al. | |
| 2021/0400885 | A1 | 12/2021 | Ouammi et al. | |
| 2022/0061236 | A1 | 3/2022 | Guan et al. | |
| 2022/0201067 | A1 | 6/2022 | Reisbick | |
| 2022/0319165 | A1* | 10/2022 | Tran | A01B 79/005 |
| 2022/0338421 | A1 | 10/2022 | Call et al. | |

OTHER PUBLICATIONS

Krishnan, "Controlled Environment Agriculture: Growing Beyond The Hype", https://www.agritecture.com, Mar. 8, 2023, 9 pages.

Minor et al., "Economic Drivers of Food Loss at the Farm and Pre-Retail Sectors: A Look at the Produce Supply Chain in the United States", USDA, Jan. 2020, 39 pages.

Unknown, "Global Commercial Greenhouse Market Report (2022 to 2027)—Industry Trends, Share, Size, Growth, Opportunity and Forecasts", Research and Markets, Aug. 22, 2022, 7 pages.

Farooq et al., "IoT Based Smart Greenhouse Framework and Control Strategies for Sustainable Agriculture", IEEE Access, Sep. 5, 2022, vol. 10, 27 pages.

Jin et al., "Deep-Learning Temporal Predictor via Bidirectional Self-Attentive Encoder-Decoder Framework for IOT-Based Environmental Sensing in Intelligent Greenhouse", MDPI Agriculture, Aug. 23, 2021, vol. 11, Issue 8, 25 bages.

Feng et al., "An IoT-based Hierarchical Control Method for Greenhouse Seedling Production", ScienceDirect, Procedia Computer Science 192 (2021) 1954-1963, Sep. 8-10, 2021, 10 pages.

Maraveas et al., "Application of Internet of Things (IoT) for Optimized Greenhouse Environments", MDPI AgriEngineering, Nov. 29, 2021, vol. 3, Issue 4, 17 pages.

Chen et al., "Develop a Smart Microclimate Control System for Greenhouses through System Dynamics and Machine Learning Techniques", MDPI Water, Dec. 3, 2022, vol. 14, Issue 23, 19 pages.

Unknown, "Apply the power of artificial intelligence (AI) and the speed of automation to improve supply chain management, resiliency and sustainability", IBM Supply Chain Intelligence Suite, IBM, Mar. 8, 2023, 5 pages.

Unknown, "Leverage artificial intelligence to mitigate supply chain disruptions", IBM Supply Chain Insights with Watson, IBM, 6 pages.

Unknown, "New technologies are unleashing a new era of efficiency, visibility and traceability in manufacturing and logistics", Supply Chain Efficiency. Digitally perfecting the supply chain, IBM, Mar. 8, 2023, 7 pages.

Unknown, "How To Improve Monitoring Of Greenhouse", Monitoring of Greenhouse Environment Using IoT, TEKTELIC, Dec. 16, 2021, 29 pages.

Williams, "Botrytis Is The Enemy Everyone Is Fighting. We Have The Solution: Botrystop WP", BioWorks, Mar. 2020, 12 pages.

Shamshiri et al., "Greenhouse Automation Using Wireless Sensors and IoT Instruments Integrated with Artificial Intelligence", Greenhouse Automation Using Wireless Sensors and IoT Instruments Integrated with Artificial Intelligence, IntechOpen, May 10, 2021, 27 pages.

Boualam, "IoT: Enabling Sustainable Shipping and Warehousing", SCM Globe, Dec. 15, 2021, 7 pages.

Boote et al., "Improving the CROPGRO-TomatoModel for Predicting Growth and Yield Response to Temperature", HortScience, vol. 47, Issue 8, Aug. 2012, 24 pages.

Tripathy et al., "MyGreen: An IoT-Enabled Smart Greenhouse for Sustainable Agriculture", IEEE Consumer Electronics Magazine, vol. 10, Issue 4, Jul. 1, 2021, 7 pages.

Kolhe et al., "Analytic for Temperature and Humidity—Cloud based Forecasting and Dashboard", 2020 4th International Conference on Intelligent Computing and Control Systems (ICICCS), May 13-15, 2020, Abstract, 2 pages.

Ashcroft, "Top 10: strategic benefits of IoT tech in supply chains", SupplyChain, https://supplychaindigital.com/digital-supply-chain/top-10-strategic-benefits-of-iot-tech-in-supply-chains, Jun. 28, 2022, 4 pages.

Unknown, "IBM Envizi: Supply Chain Intelligence", Retrieved from: https://www.ibm.com/products/envizi/supply-chain, Retrieved from the internet on Jun. 25, 2025, 3 pages.

Unknown, "IBM industry solutions", Retrieved from: https://www.ibm.com/industries, Retrieved from the Internet on Jun. 25, 2025, 7 pages.

Unknown, "IBM Supply Chain Insights with Watson", Retrieved from: https://www.ibm.com/downloads/documents/us-en/10a99803c72fda89, 2019, 6 pages.

* cited by examiner

305

| Timeline (311) | ProduceID (312) | NodeID (313) | Location (314) | Time (315) | IoT-SensorArray [IoTSensorType][NodeID] (316) | Demand Amount (317) | Demand Date (318) | Temperature (Micro-Climate Setting) (319) | Maturity day (320) |
|---|---|---|---|---|---|---|---|---|---|
| Time-1 | NULL | NULL | NULL | NULL | NULL | NULL | NULL | NULL | NULL |
| Time-2 | Tomato-001 | GreenHouse-002 | Hutto, TX | 10:00AM, 10/10/2022 | Temperature01, GreenHouse-002 | NULL | NULL | 25°C | 15 days |
| Time-2 | Tomato-001 | GreenHouse-003 | Round Rock, TX | 10:00AM, 10/10/2022 | Temperature01, GreenHouse-003 | NULL | NULL | 25°C | 15 days |
| Time-3 | Tomato-001 | GreenHouse-002 | Hutto, TX | 10:01AM, 10/10/2022 | Temperature01, GreenHouse-002 | 1000 | 10AM, 10/20/2022 | 25°C | 15 days |
| Time-3 | Tomato-001 | GreenHouse-003 | Round Rock, TX | 10:01AM, 10/10/2022 | Temperature01, GreenHouse-003 | 1100 | 10AM, 10/30/2022 | 25°C | 15 days |
| Time-4 | Tomato-001 | GreenHouse-002 | Hutto, TX | 10:02AM, 10/10/2022 | Temperature01, GreenHouse-002 | 1000 | 10AM, 10/20/2022 | 28°C (increase) | 10 days |
| Time-4 | Tomato-001 | GreenHouse-003 | Round Rock, TX | 10:02AM, 10/10/2022 | Temperature01, GreenHouse-003 | 1100 | 10AM, 10/30/2022 | 23°C (decrease) | 20 days |

FIG. 3

GREENHOUSE ENVIRONMENT CONTROL BASED ON SUPPLY CHAIN IoT ANALYSIS

BACKGROUND

Aspects of the present invention relate generally to greenhouse environment control systems and, more particularly, to intelligently controlling greenhouse environments based on Internet-of-Things (IoT) data in a supply chain.

Local production and controlled environments of grown food (e.g., produce such as fruits and vegetables) lead to a more resilient, traceable, and trustworthy supply chain. However, despite the extent of the industry, fresh produce faces significant supply and demand challenges that result in a systemic lack of high-quality, affordable produce reaching consumers.

Supply chain planning and demand forecasting are often performed using historic data. Yet despite such planning and forecasting, food waste in the form of produce that is grown but not purchased is a pervasive problem. Many factors affect the supply and demand of fresh produce, including market demand, logistics, and transportation. However, there are no current solutions to the challenges of how to adjust a growth rate of fresh produce to meet market demand and how to use supply chain analysis to control greenhouse environments. What is needed is a way to dynamically control greenhouse environments based on real-time supply chain analysis and real-time demand forecast using IoT data extracted from an IoT network.

SUMMARY

In accordance with aspects of the invention, a method, computer program product, and system are configured to: detect sensors in an Internet-of-Things (IoT) network of a supply chain of fresh produce; collect data from the detected sensors via the IoT network; determine a demand of a type of produce at a future date using the collected data and a forecasting model; determine a change to an output of a greenhouse growing the type of produce based on the determined demand for the type of produce; determine a growing plan for the greenhouse based on the determined change to the output of the greenhouse; adjust one or more growing environment conditions in the greenhouse based on the growing plan, wherein the adjusting comprises sending control signals to one or more computer-based environment control systems in the greenhouse, and wherein the adjusting changes a maturity time of a batch of the type of produce growing the greenhouse. In this manner, implementations of the invention intelligently adjust growing environment conditions in the greenhouse based on data collected from a supply chain of fresh produce, which provides the benefit of reducing food waste by more closely matching supply with demand.

In embodiments, the growing plan is determined based on causing the maturity time to align with the future date. In this manner, implementations of the invention advantageously adjust the growing of produce to coincide with predicted demand for the produce, thereby reducing food waste.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 3 shows an example of a data structure in accordance with aspects of the present invention.

DETAILED DESCRIPTION

Figure 1:
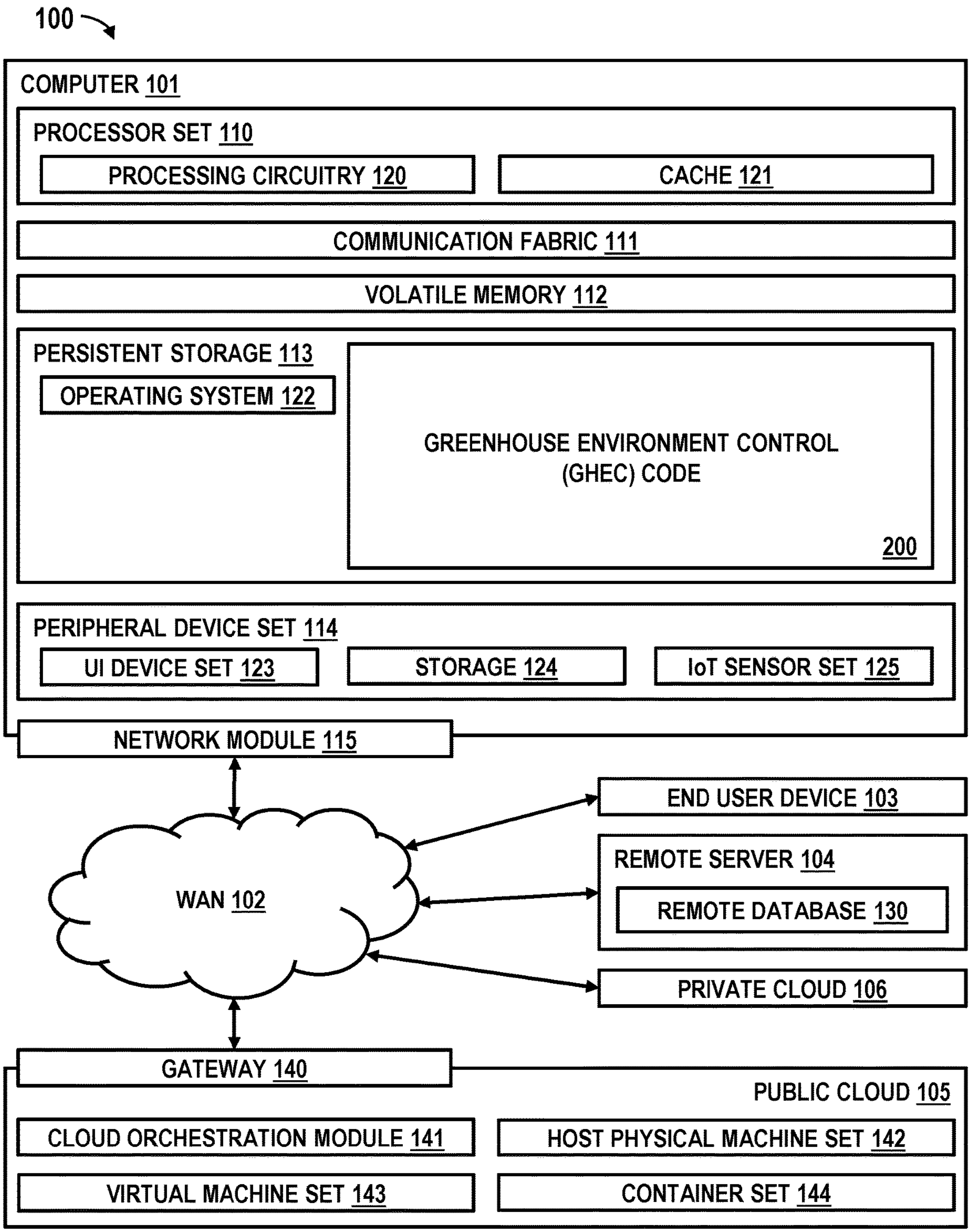
FIG. 1 depicts a computing environment according to an embodiment of the present invention.

Aspects of the present invention relate generally to greenhouse environment control systems and, more particularly, to intelligently controlling greenhouse environments based on Internet-of-Things (IoT) data in a supply chain. Implementations of the invention address the problem of food waste of produce by dynamically controlling greenhouse environments based on real-time supply chain analysis and real-time demand forecast using IoT data extracted from an IoT network. By automatically and dynamically controlling growing systems in different greenhouses based on data collected from IoT devices in the supply chain, implementations of the invention automatically and dynamically adjust the supply of produce grown in the greenhouses to meet specific forecasted demand for fresh produce. In this manner, implementations of the invention provide a technical solution to the problem of food waste that occurs from mismatched supply and demand.

In accordance with aspects of the invention, a method, system, and computer program product are configured to: track the status of IoT devices in an IoT Network (e.g., using a greenhouse environment control (GHEC) tracker); send tracked status data to a demand forecasting engine to obtain produce demand forecasting data for specific dates (e.g., using a demand forecasting engine and demand forecasting modules); determine total produce demands according to the obtained produce demand forecasting data (e.g., using a demand agent); plan an ideal growth micro-climate configuration plan for each greenhouse according to current growing conditions and the demand forecasting data (e.g., using a GHEC planner); and adjust each micro-climate setting in each greenhouse according to the ideal growth micro-climate configuration plan (e.g., using a GHEC adjuster). In embodiments, the method, system, and computer program product are configured to: detect all connected GHEC nodes through a GHEC IoT network (e.g., using a GHEC detector); and collect IoT data from all detected nodes (e.g., using a GHEC data collector). The nodes may include, for example, IoT devices in greenhouses, delivery stations, delivery trucks, warehouses, distributors, retail store shelves, etc.

In embodiments, the method, system, and computer program product are configured to: define a framework to support a greenhouse environment control (GHEC) system (e.g., using a GHEC server and a GHEC client); define a user interface for managing a supply chain IoT network configuration (e.g., using a GHEC manager and a GHEC service profile); define and update a data structure for tracking and saving the supply chain IoT network status on a given fresh produce name (e.g., using a GHEC data structure); and create a supply chain IoT network for the specified fresh produce and connecting all GHEC nodes of the supply chain. The GHEC data structure may include parameters including but not limited to ProduceID, NodeID, Location, Time, IoT-SensorArray (IoTSensorType, NodeID), Demand (Amount, Date), and MicroClimateSetting (temperature, humidity, soil-moisture, soil-pH, carbon dioxide concentration, maturity time).

In this manner, embodiments provide a method, system, and computer program product for greenhouse environment control based on supply chain IoT analysis that: proactively controls the growing rate of produce in greenhouses according to supply chain data; precisely adjusts the expected maturity time of the growing produce based on warehouse demand from IoT network; smartly controls micro-climate environments in multiple greenhouses for securing a specific fresh produce supply chain; and intelligently secures an entire supply chain from producers to retailers.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as greenhouse environmental control (GHEC) code at block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
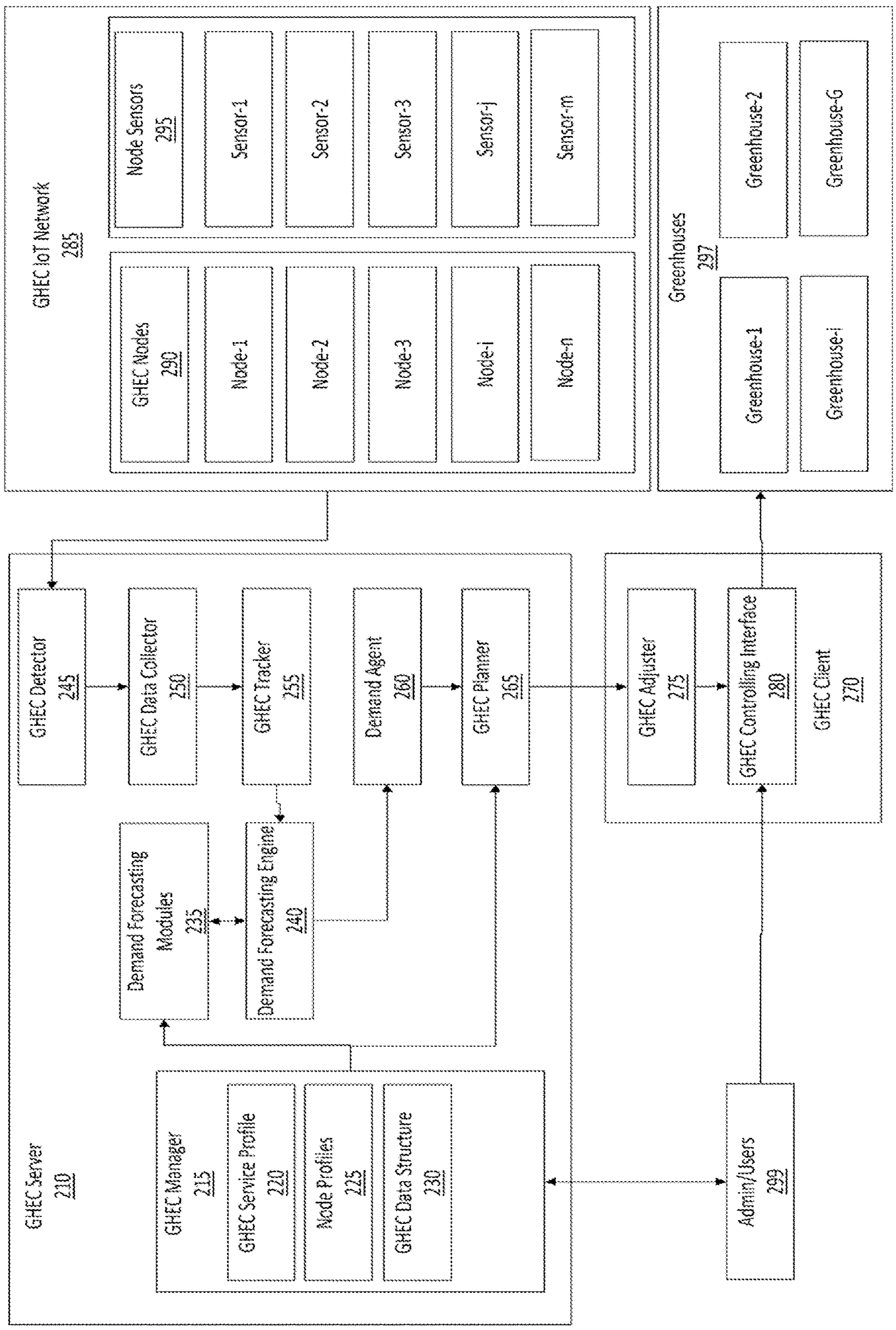
FIG. 2 shows a block diagram of an exemplary environment in accordance with aspects of the present invention.

FIG. 2 shows a block diagram of an exemplary environment in accordance with aspects of the invention. In embodiments, the environment includes a GHEC server 210, a GHEC client 270, a GHEC IoT network 285, greenhouses 297, and admin/users 299. In embodiments, the GHEC server 210 runs the GHEC code of block 200 of FIG. 1. The GHEC server 210 may comprise one or more instances of computer 101 of FIG. 1. The GHEC server 210 may alternatively comprise one or more virtual machines or one or more containers running on one or more instances of computer 101 of FIG. 1.

In embodiments, the GHEC server 210 of FIG. 2 comprises a GHEC manager 215, demand forecasting modules 235, demand forecasting engines 240, GHEC detector 245, GHEC data collector 250, GHEC tracker 255, demand agent 260, and GHEC planner 265, each of which may comprise modules of the GHEC code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the GHEC code of block 200 are executable by the processing circuitry 120 of FIG. 1 to perform the inventive methods as described herein. The GHEC server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the GHEC IoT network 285 comprises an IoT network of IoT devices in a supply chain of fresh produce (e.g., fruits and/or vegetable grown for consumption). In embodiments, the GHEC IoT network 285 comprises GHEC nodes 290 (e.g., node-1, node-2, node-3, . . . , node-i, . . . , node-n) each comprising one or more node sensors 295. For example, node-i of the GHEC nodes 290 may comprise node sensors 295 including sensor-1, sensor-2, sensor-3, . . . , sensor-j . . . sensor-m. In embodiments, the GHEC nodes 290 comprise nodes in a fresh produce supply chain, and may include greenhouses, delivery stations, delivery trucks, warehouses, distributors, retail store shelves, for example. In embodiments, the node sensors 295 comprise IoT devices associated with respective ones of the GHEC nodes 290, where a respective node sensor obtains and reports supply chain data associated with its respective one of the GHEC nodes 290.

In one illustrative example, a GHEC node 290 may comprise a delivery truck that has plural node sensors 295 that report data about the amounts of different types of produce currently in the delivery truck. In this example, the delivery truck may be equipped with a first node sensor 295 that reports an amount of lettuce carried by the truck and a second node sensor that reports an amount of tomatoes carried by the truck. These node sensors 295 may obtain their respective data using techniques such as bar code scanning of containers holding produce, RFID detection of containers holding produce, etc., as such containers are loaded into and taken out of the truck. In this manner, the node sensors 295 can provide real-time data of how much of each type of produce is in the truck. In this example, the delivery truck may have other node sensors 295 that report other supply chain data. For example, the truck may be equipped with another node sensor 295 that reports a location of the truck in real-time. Other examples of GHEC nodes 290 and node sensors 295 include: a greenhouse (e.g., a GHEC node 290) that includes different sensors (e.g., node sensors 295) that report amounts of different types of produce (e.g., lettuce, tomatoes, etc.) that are harvested and ready to ship from the greenhouse; and a retail store (e.g., a GHEC node 290) that includes different sensors (e.g., node sensors 295) that report amounts of different types of fresh produce (e.g., lettuce, tomatoes, etc.) that are in stock and available for sale at the store. These examples are not limiting, and other types of supply chain nodes with node sensors may be used in the GHEC IoT network 285.

The GHEC IoT network 285 may include plural different instances of a same type of GHEC node 290. For example, the GHEC IoT network 285 may include plural greenhouse nodes, plural delivery truck nodes, and plural retail store nodes, with all of the different nodes including node sensors that are reporting their respective data via the GHEC IoT network 285.

The types of supply chain data obtained by the node sensors 295 as described in these examples are not limiting. In embodiments, the node sensors 295 may be configured to obtain and report other types of supply chain data that are used in demand forecasting for fresh produce, including but not limited to amounts of different types of produce in the supply chain, locations of different types of produce in the supply chain, speed of travel of different types of produce in the supply chain, etc.

In accordance with aspects of the invention, the greenhouses 297 comprise one or more greenhouses (e.g., greenhouse-1, greenhouse-2 . . . , greenhouse-i, . . . , greenhouse-G) that grow one or more types of produce. In embodiments, the greenhouses 297 comprise automated/smart greenhouses that include sensors that detect growing environment conditions and that include computer-based control systems configured to automatically adjust the growing environment conditions. Growing environment conditions may include but are not limited to: ambient (e.g., air) temperature; ambient humidity; ambient carbon dioxide concentration; soil temperature; soil moisture level; and soil pH level. In embodiments, the greenhouses 297 comprise sensors that detect amounts of produce being grown. For example, a greenhouse may be equipped with video-based sensors that use computer vision to detect an amount of lettuce being grown in a first part of the greenhouse, an amount of lettuce being grown in a second part of the greenhouse, an amount of tomatoes being grown in a third part of the greenhouse, etc. The greenhouses 297 may be included in the GHEC nodes 290 and the sensors in the greenhouses 297 that detect growing environment conditions may be included in the node sensors 295. In this manner, growing data including the growing amount(s) data and the growing environment condition(s) data detected by these sensors may be reported to the GHEC server 210 via the GHEC IoT network 285.

In accordance with aspects of the invention, the GHEC client 270 comprises one or more end user devices 103, one or more remote servers 104, and/or one or more private clouds 106 of FIG. 6. In embodiments, the GHEC client 270 comprises a GHEC adjuster 275 that includes one or more modules of code. Such modules may include routines, programs, objects, components, logic, data structures, and so on that perform particular tasks or implement particular data types that the code of block 200 leverages to carry out the functions and/or methodologies of embodiments of the invention as described herein. In embodiments, the GHEC client 270 comprises a GHEC controlling interface 280, which may include one or more computer-based interfaces that the GHEC client 270 uses to convey control signals to computer-based control systems in the greenhouses 297.

In accordance with aspects of the invention, the admin/users 299 comprise one or more end user devices 103 that communicate with the GHEC server 210 and the GHEC client 270. In embodiments, computer-based communication between different ones of the elements of the environment (e.g., GHEC server 210, GHEC client 270, GHEC IoT network 285, greenhouses 297, and admin/users 299) occurs using one or more networks such as the WAN 102 of FIG. 1.

Still referring to FIG. 2, in accordance with aspects of the invention, the GHEC server 210 is configured to receive supply chain data and growing data from the GHEC IoT network 285, determine a demand using demand forecasting techniques with the supply chain data, create a growing plan for the greenhouses 297 based on the determined demand and the current growing data, and communicate the growing plan to the GHEC client 270. In embodiments, in response to receiving the growing plan from the GHEC server 210, the GHEC client 270 communicates control signals to the computer-based control systems in the greenhouses 297 to implement the growing plan by adjusting the growing environment conditions in a manner that is configured to meet the determined demand.

In accordance with aspects of the invention, the GHEC detector 245 is configured to detect the node sensors 295 in the GHEC IoT network 285. In embodiments, the GHEC detector 245 detects the node sensors 295 using IoT communication protocols for detecting IoT sensors.

In accordance with aspects of the invention, the GHEC data collector 250 is configured to collect data from the node sensors 295 detected by the GHEC detector 245. In embodiments, the GHEC data collector 250 collects the data from the detected node sensors 295 via the GHEC IoT network 285 using IoT communication protocols. In embodiments, and as described herein, the collected data includes supply chain data from supply chain nodes, such as data that defines amounts of produce at supply chain locations, speed of travel of produce in transit, expected delivery times of produce in transit, etc. In embodiments, and as described herein, the collected data also includes growing data including the growing amounts and the growing environment conditions of produce being grown at the greenhouses 297.

In accordance with aspects of the invention, the GHEC tracker 255 is configured to populate and update data structures that are used to track the historical and current supply chain data, growing environment conditions at the greenhouses 297, and amounts of produce being grown at the greenhouses 297. In embodiments, the GHEC server 210 uses one or more such data structures to track amounts of produce currently available for sale (e.g., at physical stores, online, etc.) and in transit, which is used in forecasting demand. In embodiments, the GHEC server 210 also uses one or more such data structures to track amounts of produce currently being grown in the greenhouses 297, which is used in creating a growing plan to meet the determined demand. An example of a data structure is described with respect to FIG. 3.

In accordance with aspects of the invention, the demand forecasting engine 240 is configured to determine a future demand for fresh produce based on the tracked data in the one or more data structures. In embodiments, the demand forecasting engine 240 accesses the tracked data via the data structure, selects an appropriate module from the demand forecasting modules 235 for use with the tracked data, and determines (e.g., forecasts) a demand for a product (e.g., a type of fresh produce) using the selected module and the tracked data. In embodiments, the demand forecasting modules 235 comprise different forecasting models for different types of produce (e.g., lettuce, tomatoes, etc.). In embodiments, the demand forecasting engine 240 extracts data of a particular type of produce (e.g., lettuce) from the one or more data structures, selects an appropriate model from the demand forecasting modules 235 for this type of produce, and uses the extracted data with the selected one of the models to determine a demand for this type of produce. In this manner, the demand forecasting engine 240 determines different demands for different types of produce using the supply chain data obtained via the GHEC IoT network 285. In embodiments, the demand forecasting modules 235 comprise forecasting models in the form of computer-based algorithms that are configured to predict demand for a type of produce based on supply chain data. These models may include but are not limited to causal product demand forecasting, ensemble demand forecasting, disaggregated demand forecasting from ensemble demand forecasts, and forecasting using simulations.

In accordance with aspects of the invention, the demand agent 260 is configured to determine a change to the output of one or more of the greenhouses 297 to meet the demand determined by the demand forecasting engine 240. In embodiments, the demand agent 260 receives the determined demand from the demand forecasting engine 240. In embodiments, the demand agent 260 also obtains data defining the amounts of produce being grown at the greenhouses 297 and the expected maturity times of these amounts. As used herein, a maturity time may comprise an estimated time until a particular batch of growing produce is ready for harvest or ready to ship to a seller. Different portions of the produce grown in one greenhouse will typically have different maturity times. Based on the amounts of produce being grown at the greenhouses 297 and the maturity times of these amounts, the demand agent 260 determines a change to the output of one or more of the greenhouses 297 to meet the determined demand for this type of produce. In embodiments, a change to the output of one of the greenhouses 297 comprises an adjustment to a maturity time of an amount of produce being grown by the greenhouse.

In embodiments, the demand agent 260 determines such adjustments using one or more parameter optimization algorithms to determine optimum maturity times for particular amounts of produce to meet the determined demand. Examples of parameters that may be used in such algorithms include but are not limited to: amounts of each type of produce already in the supply chain (e.g., where produce that is already in the supply chain is fresh produce that has already been grown and harvested and is ready to ship to a retailer, in transit to a retailer, or currently available for sale by a retailer); locations of each type of produce already in the supply chain; amounts of types of produce currently being grown at each greenhouse; maturity times of units of each type of produce at each greenhouse; physical location of each greenhouse; physical location of predicted demand; amount of predicted demand; date of predicted demand; time to ship from greenhouse locations to locations of predicted demand; cost to ship from greenhouse locations to locations of predicted demand; and cost of adjusting growing environment conditions of each batch at each greenhouse. The demand agent 260 may use parameter optimization techniques and algorithms to define a parameter optimization problem using these parameters and to determine optimum maturity times and amounts for types of produce by solving the parameter optimization problem using the determined demand and the supply chain data that corresponds to the parameters in the parameter optimization problem. In embodiments, the optimum maturity times and amounts define, for each greenhouse, how many units of a type of produce to mature by particular dates.

In an illustrative example, the demand forecasting engine 240 determines demands for lettuce as follows: 1300 pounds on day 12, 1900 pounds on day 17, and 800 pounds on day 26. In this example, based on these demand amounts and the supply chain data (e.g., including but not limited to amounts of lettuce already in the supply chain), the demand agent 260 determines optimum maturity times and amounts for a particular one of the greenhouses 297, where the optimum maturity times and amounts indicate that this greenhouse should mature 1000 pounds of lettuce on day 10, 1500 pounds of lettuce on day 15, and 700 pounds of lettuce on day 24.

Figure 4:
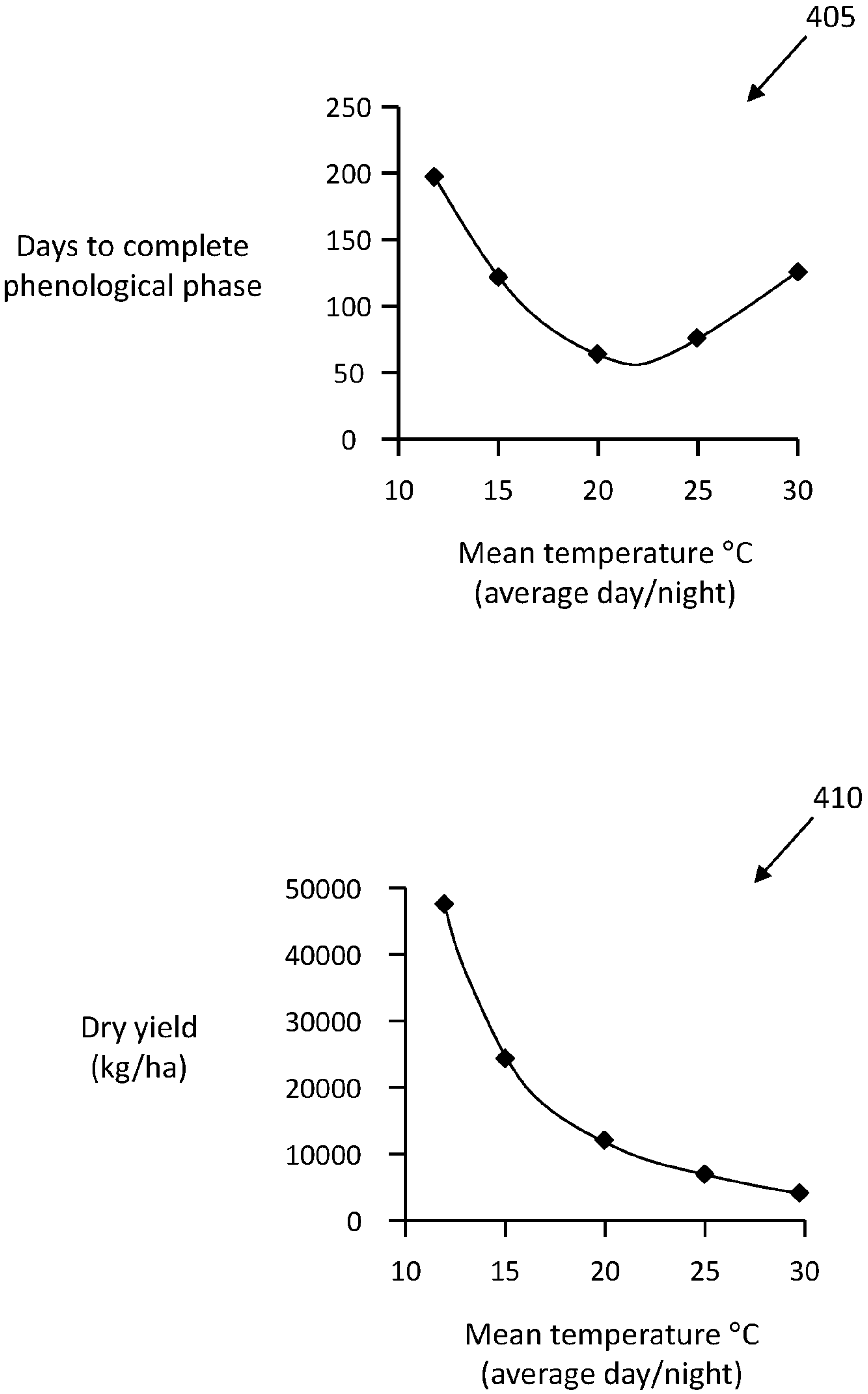
FIG. 4 shows examples of relationships usable to determine adjustments to growing environment conditions in accordance with aspects of the present invention.

In accordance with aspects of the invention, the GHEC planner 265 is configured to determine a growing plan in one or more of the greenhouses 297 based on the change(s) to the output(s) determined by the demand agent 260. In embodiments, the growing plan comprises a plan of adjusted growing environment conditions in respective ones of the greenhouses 297 determined based on: current growing amounts and current maturity times of specific batches of produce in this greenhouse; current growing environment conditions for the batches in this greenhouse; the optimum maturity times and amounts determined by the demand agent 260; and relationships that define how maturity time varies with growing environment conditions for different types of produce. Examples of such relationships are shown in FIG. 4. Using one or more of these relationships with the current status of the produce being grown, the GHEC planner 265 determines a plan of adjusted growing environment conditions to meet the optimum maturity times and amounts determined by the demand agent 260.

In accordance with aspects of the invention, the GHEC adjuster 275 is configured to generate instructions to the GHEC controlling interface 280 based on the adjusted growing environment conditions determined by the GHEC planner 265. In embodiments, the GHEC adjuster 275 receives the adjusted growing environment conditions from the GHEC planner 265 and determines how to adjust one or more computer-based control systems in the greenhouse to achieve the adjusted growing environment conditions.

In accordance with aspects of the invention, the GHEC controlling interface 280 is configured to convey control signals to computer-based control systems in the greenhouses 297 based on the instructions received from the GHEC adjuster 275. In an illustrative example, the GHEC adjuster 275 receives data defining an adjusted growing environment condition of 80 degrees Fahrenheit and sends an instruction to the GHEC controlling interface 280 to change the temperature in the greenhouse to 80 degrees Fahrenheit. In this example, the GHEC controlling interface 280 conveys a control signal to a thermostat of an air temperature control system (e.g., a heating, ventilation, and air conditioning (HVAC) system in the greenhouse) that causes the air temperature control system to make the air in the greenhouse be 80 degrees Fahrenheit. Air temperature is just one example, and the GHEC controlling interface 280 may be configured to convey different control signals to different computer-based control systems in the greenhouse to control (e.g., adjust) the levels of ambient (e.g., air) temperature, ambient humidity, ambient carbon dioxide concentration, soil temperature, soil moisture level, and soil pH level.

With continued reference to FIG. 2, in embodiments the GHEC manager 215 includes a GHEC service profile 220, node profiles 225, and GHEC data structure 230. In embodiments, the GHEC data structure 230 comprises one or more data structures maintained by the GHEC tracker as described herein, where these data structures store the tracked data comprising supply chain data and growing data. In embodiments, the node profiles 225 store data defining aspects of each of the GHEC nodes 290, including but not limited to physical location of the node and per-unit cost of adjusting different ones of the growing environment condition in the node. In embodiments, the service profile 220 stores data defining aspects of the service provided by the system including but not limited to which types of produce to track, types of produce for which to store forecasting modules, and types of produce for which to determine demand.

FIG. 3 shows an example of a data structure 305 in accordance with aspects of the present invention. The data structure 305 is an example of one such GHEC data structure 230 of FIG. 2. In this example, the data structure 305 includes columns for Timeline at column 311, ProductID at column 312, NodeID at column 313, Location at column 314, Time at column 315, IoT-SensorArray at column 316, Demand Amount at column 317, Demand Date at column 318, Temperature at column 319, and Maturity time at column 320. The data in these columns is exemplary, and the data structure 305 may include other columns for other supply chain data and growing data as described herein.

In this example, the maturity time data in column 320 indicates the estimate of time that it will take for a batch of produce to mature in a given greenhouse under the current growing environment conditions. For example, as shown at time Time-2, Greenhouse-002 has a temperature of 25° C. and a maturity time of 15 days from the current date of Oct. 10, 2022 for its batch of produce defined as Tomato-001. Similarly, in this example at time Time-2, Greenhouse-003 has a temperature of 25° C. and a maturity time of 15 days from the current date of Oct. 10, 2022 for its batch of produce defined as Tomato-001.

In this example, the demand agent 260 updates the data structure 305 at time Time-3 based on demand determined by the demand forecasting engine 240. In this example, to meet the demand determined by the demand forecasting engine 240, the demand agent 260 updates the data structure 305 with data indicating that Greenhouse-002 should produce 1000 units of Tomato-001 by the date of Oct. 20, 2022, and that Greenhouse-003 should produce 1100 units of Tomato-001 by the date of Oct. 30, 2022. In this example, column 317 and column 318 correspond to the amounts and maturity times, respectively, determined by the demand agent 260 for particular ones of the greenhouses and based on the demand determined by the demand forecasting engine 240. As such, in the example data structure 305, column 318 represents a target date for maturity of a batch of produce as determined by the demand agent 260, and column 320 represents the actual estimated maturity time for this batch of produce based on the current growing environment conditions.

In this example at time Time-3, Greenhouse-002 has a maturity time of 15 days from the current date of Oct. 10, 2022 for its batch of produce defined as Tomato-001; however, also at time Time-3 Greenhouse-002 has a demand of 1000 units with a demand date of Oct. 20, 2022. In this example, the demand date of Oct. 20, 2022 is 10 days from the current date, and this 10 days is less than the maturity time of 15 days for this batch of tomatoes. Based on this, the GHEC planner 265 determines adjusted growing environment conditions for this batch of produce (e.g., Tomato-001 of Greenhouse-002) to satisfy the demand date of Oct. 20, 2022. In this example, the GHEC planner 265 determines that adjusting the air temperature in Greenhouse-002 from 25° C. to 28° C. changes the maturity time from 15 days to 10 days, e.g., using relationships such as those shown in FIG. 4. Based on this, at time Time-4 that data structure is updated to indicate the air temperature of Greenhouse-002 is increased to 28° C. and that the maturity time for Greenhouse-002 is now 10 days. Based on this, the GHEC adjuster 275 causes the GHEC controlling interface 280 to send control signals to the air temperature control system of Greenhouse-002 to adjust the air temperature to be 28° C. In this manner, the system adjusts the growing environment conditions of Greenhouse-002 to cause a change in the maturity time of the Tomato-001 batch growing in Greenhouse-002 so that this produce will have a maturity time at column 320 from the current date that matches the demand date at column 318. In this manner, the system adjusts the growing environment conditions of Greenhouse-002 to meet determined (e.g., forecasted) demand.

In this example at time Time-3, Greenhouse-003 has a maturity time of 15 days from the current date of Oct. 10, 2022 for its batch of produce defined as Tomato-001; however, also at time Time-3 Greenhouse-003 has a demand of 1100 units with a demand date of Oct. 30, 2022. In this example, the demand date of Oct. 30, 2022 is 20 days from the current date, and this 20 days is more than the maturity time of 15 days for this batch of tomatoes. Based on this, the GHEC planner 265 determines adjusted growing environment conditions for this batch of produce (e.g., Tomato-001 of Greenhouse-003) to satisfy the demand date of Oct. 30, 2022. In this example, the GHEC planner 265 determines that adjusting the air temperature in Greenhouse-003 from 25° C. to 23° C. changes the maturity time from 15 days to 20 days, e.g., using relationships such as those shown in FIG. 4. Based on this, at time Time-4 that data structure is updated to indicate the air temperature of Greenhouse-003 is decreased to 23° C. and that the maturity time for Greenhouse-003 is now 20 days. Based on this, the GHEC adjuster 275 causes the GHEC controlling interface 280 to send control signals to the air temperature control system of Greenhouse-003 to adjust the air temperature to be 23° C. In this manner, the system adjusts the growing environment conditions of Greenhouse-003 to cause a change in the maturity time of the Tomato-001 batch growing in Greenhouse-003 so that this produce will have a maturity time at column 320 from the current date that matches the demand date at column 318. In this manner, the system adjusts the growing environment conditions of Greenhouse-003 to meet determined (e.g., forecasted) demand.

FIG. 4 shows examples of relationships usable to determine adjustments to growing environment conditions in accordance with aspects of the present invention. Relationship 405 shows a graph of days to complete phenological phase on the vertical axis and mean temperature on the horizontal axis. This relationship 405 shows that varying the mean temperature can cause a change in the phenological phase (e.g., growing stages) of the growing produce. This relationship 405 can be used to determine an adjustment to air temperature to cause a change in maturity time of a specific type of produce. Relationship 410 shows a graph of dry yield on the vertical axis and mean temperature on the horizontal axis. This relationship 410 shows that varying the mean temperature can cause a change in yield (e.g., amount successfully grown) of the growing produce. This relationship 410 can be used to determine an adjustment to air temperature to cause a change in amount grown of a specific type of produce. The relationships 405 and 410 are exemplary. These relationships may be determined from experimental data and saved in a knowledge base. Other predefined relationships may be used that relate maturity time and/or yield to other ones of the growing environment conditions such as ambient (e.g., air) temperature; ambient humidity; ambient carbon dioxide concentration; soil temperature; soil moisture level; and soil pH level. In embodiments, the GHEC planner 265 uses one or more of these types of relationships to determine adjusted growing environment conditions to meet the outputs (e.g., amounts and dates) determined by the demand agent 260.

Figure 5:
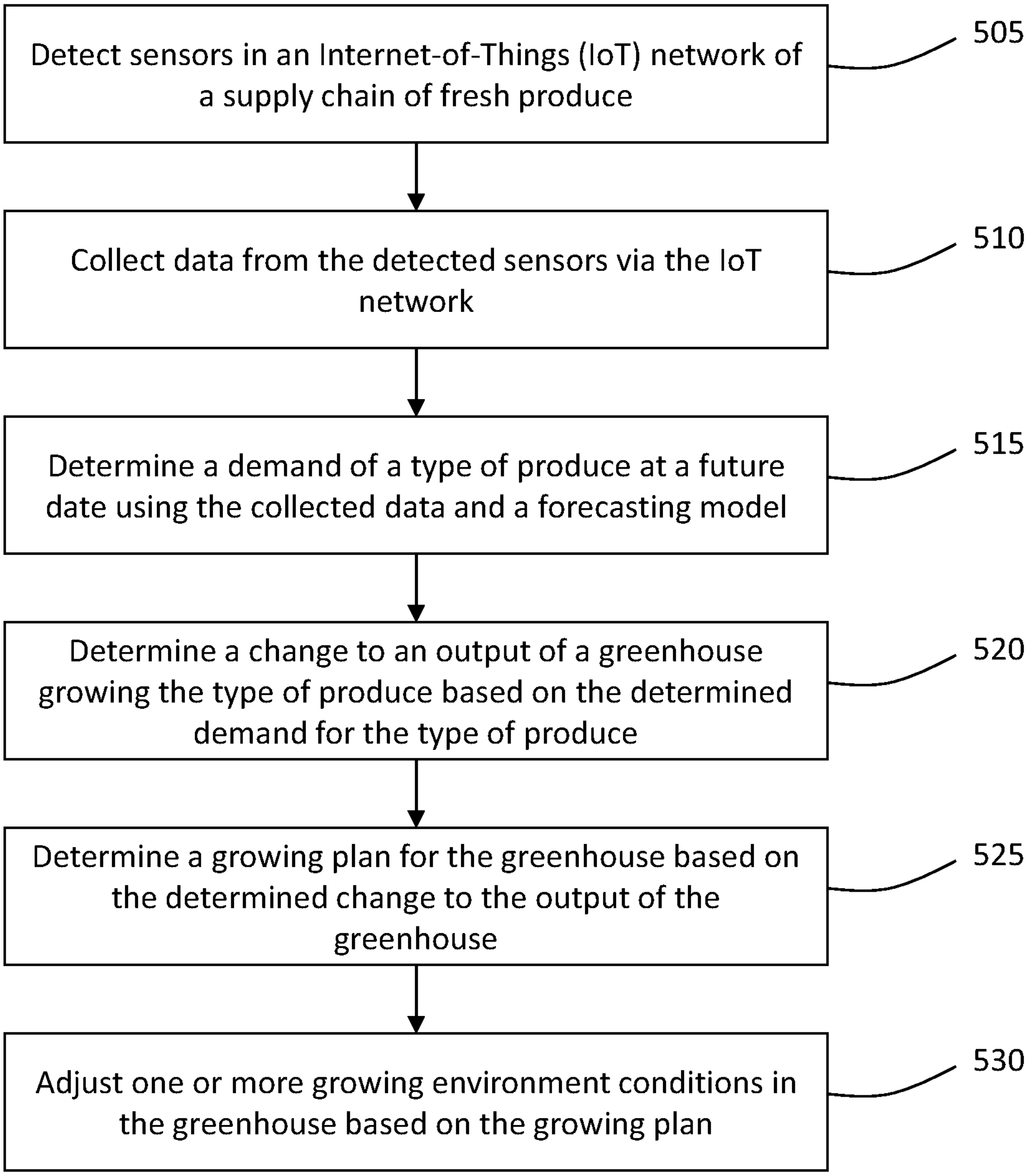
FIG. 5 shows a flowchart of an exemplary method in accordance with aspects of the present invention.

FIG. 5 shows a flowchart of an exemplary method in accordance with aspects of the present invention. Steps of the method may be carried out in the environment of FIG. 2 and are described with reference to elements depicted in FIG. 2.

At step 505, the system detects sensors in an Internet-of-Things (IoT) network of a supply chain of fresh produce. In embodiments, and as described with respect to FIG. 2, the GHEC detector 245 detects node sensors 295 in the GHEC IoT network 285.

At step 510, the system collects data from the detected sensors via the IoT network. In embodiments, and as described with respect to FIG. 2, the GHEC data collector 250 collects data from the detected node sensors 295 via the GHEC IoT network 285. In embodiments, the collected data comprises supply chain data and growing data. In embodiments, the supply chain data comprises data defining amounts and locations of respective types of fresh produce in the supply chain. In embodiments, the growing data comprises currently growing amounts and locations of the respective types of fresh produce in the supply chain. In embodiments, the method comprises tracking the data over time in a data structure.

At step 515, the system determines a demand of a type of produce at a future date using the collected data and a forecasting model. In embodiments, and as described with respect to FIG. 2, the demand forecasting engine 240 extracts data of a particular type of produce (e.g., lettuce) from one or more data structures, selects an appropriate model from the demand forecasting modules 235 for this type of produce, and uses the extracted data with the selected one of the models to determine a demand for this type of produce for one or more future dates.

At step 520, the system determines a change to an output of a greenhouse growing the type of produce based on the determined demand for the type of produce. In embodiments, and as described with respect to FIG. 2, the demand agent 260 determines the change to the output based on amounts of produce being grown at the greenhouses 297, the maturity times of these amounts, and the determined demand. In embodiments, a change to the output of one of the greenhouses 297 comprises an adjustment to a maturity time of an amount of produce being grown by the greenhouse.

At step 525, the system determines a growing plan for the greenhouse based on the determined change to the output of the greenhouse. In embodiments, and as described with respect to FIG. 2, the GHEC planner 265 determines a plan of adjusted growing environment conditions to meet the change to the output. In embodiments, the growing plan is determined based on causing the maturity time to align with the future date, e.g., as described with respect to FIG. 3.

At step 530, the system adjusts one or more growing environment conditions in the greenhouse based on the growing plan. In embodiments, and as described with respect to FIG. 2, the GHEC controlling interface 280 conveys control signals to computer-based control systems in the greenhouses 297 based on the growing plan. In embodiments, the adjusting comprises sending control signals to one or more computer-based environment control systems in the greenhouse. In embodiments, the adjusting changes a maturity time of a batch of the type of produce growing the greenhouse. In embodiments, the one or more growing environment conditions comprise one or more selected from a group consisting of: ambient temperature, ambient humidity, ambient carbon dioxide concentration, soil temperature, soil moisture level, and soil pH level.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:

detecting, by the processor set, a greenhouse environmental control (GHEC) tracker comprising sensors in an Internet-of-Things (IoT) network of a supply chain comprising a greenhouse comprising a plurality of micro-climates and growing at least one batch of the type of fresh produce in at least one micro-climate;

collecting, by the processor set, from the detected sensors via the IoT network, greenhouse status data for the at least one micro-climate in the greenhouse growing the at least one batch of the type of fresh produce;

collecting, by the processor set, from the detected sensors via the IoT network, growing or supply chain data other than the greenhouse status data for the at least one micro-climate;

determining, by the processor set, a demand of the type of produce at a future date using the collected data for the at least one micro-climate, the collected growing or supply chain data other than the greenhouse status data for the at least one micro-climate, and a forecasting model, wherein the determining the demand comprises selecting, based on the type of fresh produce, the forecasting model from a plurality of different forecasting models associated with different types of fresh produce;

determining, by the processor set using the greenhouse status data, a maturity time of the at least one batch of the type of fresh produce in the at least one micro-climate in the greenhouse to meet the determined demand;

determining, by the processor set, a change to an output of the at least one micro-climate in the greenhouse growing the at least one batch of the type of fresh produce, wherein the change is determined based on the determined demand for the type of fresh produce and the maturity time of the at least one batch of the type of fresh produce;

determining, by the processor set, a growing plan for the greenhouse and the fresh produce based on the determined change to the output of the at least one micro-climate of the greenhouse; and adjusting, by the processor set and the GHEC tracker, one or more growing environment conditions in the at least one micro-climate of the greenhouse based on the growing plan, wherein the adjusting comprises sending control signals from the GHEC tracker to one or more computer-based environment control systems in the greenhouse, and wherein the adjusting changes the maturity time of the at least one batch of the type of fresh produce growing in the greenhouse to align with the future date for meeting the demand.

2. The method of claim 1, wherein the growing plan is determined based on causing the maturity time to align with the future date.

3. The method of claim 1, wherein the supply chain data comprises data defining amounts and locations of respective types of fresh produce in the supply chain.

4. The method of claim 3, wherein the growing data comprises currently growing amounts and locations of the respective types of fresh produce in the supply chain.

5. The method of claim 1, further comprising tracking the growing and/or supply chain data over time in a data structure.

6. The method of claim 1, wherein the one or more growing environment conditions comprise one or more selected from a group consisting of: ambient temperature, ambient humidity, ambient carbon dioxide concentration, soil temperature, soil moisture level, and soil pH level.

7. A computer program product comprising one or more computer readable storage media having program instructions collectively stored on the one or more computer readable storage media, the program instructions executable to:

detect a greenhouse environmental control (GHEC) tracker comprising sensors in an Internet-of-Things (IoT) network of a supply chain comprising a greenhouse comprising a plurality of micro-climates and growing at least one batch of the type of fresh produce in at least one micro-climate;

collect from the detected sensors via the IoT network, greenhouse status data from for the at least one micro-climate in the greenhouse growing the at least one batch of the type of fresh produce;

collect from the detected sensors via the IoT network, growing or supply chain data other than the greenhouse status data for the at least one micro-climate;

determine a demand of the type of produce at a future date using the collected data for the at least one micro-climate, the collected growing or supply chain data other than the greenhouse status date for the at least one micro-climate, and a forecasting model, wherein the determining the demand comprises selecting, based on the type of fresh produce, the forecasting model from a plurality of different forecasting models associated with different types of fresh produce;

determine, using the greenhouse status data, a maturity time of the at least one batch of the type of fresh produce in the at least one micro-climate in the greenhouse to meet the determined demand;

determine a change to an output of at least one micro-climate in the greenhouse growing the at least one batch of the type of fresh produce, wherein the change is determined based on the determined demand for the type of fresh produce and the maturity time of the at least one batch of the type of fresh produce;

determine a growing plan for the greenhouse and the fresh produce based on the determined change to the output of the at least one micro-climate of the greenhouse; and adjust by the GHEC tracker one or more growing environment conditions in the at least one micro-climate of the greenhouse based on the growing plan, wherein the adjusting comprises sending control signals from the GHEC tracker to one or more computer-based environment control systems in the greenhouse, and wherein the adjusting changes the maturity time of the at least one batch of the type of fresh produce growing in the greenhouse to align with the future date for meeting the demand.

8. The computer program product of claim 7, wherein the growing plan is determined based on causing the maturity time to align with the future date.

9. The computer program product of claim 7, wherein the supply chain data comprises data defining amounts and locations of respective types of fresh produce in the supply chain.

10. The computer program product of claim 9, wherein the growing data comprises currently growing amounts and locations of the respective types of fresh produce in the supply chain.

11. The computer program product of claim 7, wherein the program instructions are executable to track the growing and/or supply chain data over time in a data structure, and wherein the selected forecasting model comprises ensemble demand forecasting or disaggregated demand forecasting from ensemble demand forecasts.

12. The computer program product of claim 7, wherein the one or more growing environment conditions comprise one or more selected from a group consisting of: ambient temperature, ambient humidity, ambient carbon dioxide concentration, soil temperature, soil moisture level, and soil pH level.

13. A system comprising:

a processor set, one or more computer readable storage media, and program instructions collectively stored on the one or more computer readable storage media, the program instructions executable to:

detect a greenhouse environmental control (GHEC) tracker comprising sensors in an Internet-of-Things (IoT) network of a supply chain comprising a greenhouse comprising a plurality of micro-climates and growing at least one batch of the type of fresh produce in at least one micro-climate;

collect from the detected sensors via the IoT network, greenhouse status data from for the at least one micro-climate in the greenhouse growing the at least one batch of the type of fresh produce;

collect from the detected sensors via the IoT network, growing or supply chain data other than the greenhouse status data for the at least one micro-climate;

determine a demand of the type of produce at a future date using the collected data for the at least one micro-climate, the collected growing or supply chain data other than the greenhouse status date for the at least one micro-climate, and a forecasting model, wherein the determining the demand comprises selecting, based on the type of fresh produce, the forecasting model from a plurality of different forecasting models associated with different types of fresh produce;

determine, using the greenhouse status data, a maturity time of the at least one batch of the type of fresh produce in the at least one micro-climate in the greenhouse to meet the determined demand;

determine a change to an output of at least one micro-climate in the greenhouse growing the at least one batch of the type of fresh produce, wherein the change is determined based on the determined demand for the type of fresh produce and the maturity time of the at least one batch of the type of fresh produce;

determine a growing plan for the greenhouse and the fresh produce based on the determined change to the output of the at least one micro-climate of the greenhouse; and adjust by the GHEC tracker one or more growing environment conditions in the at least one micro-climate of the greenhouse based on the growing plan, wherein the adjusting comprises sending control signals from the GHEC tracker to one or more computer-based environment control systems in the greenhouse, and wherein the adjusting changes the maturity time of the at least one batch of the type of fresh produce growing in the greenhouse to align with the future date for meeting the demand.

14. The system of claim 13, wherein the growing plan is determined based on causing the maturity time to align with the future date.

15. The system of claim 13, wherein:

the supply chain data comprises data defining amounts and locations of respective types of fresh produce in the supply chain; and the growing data comprises currently growing amounts and locations of the respective types of fresh produce in the supply chain.

16. The system of claim 13, wherein the program instructions are executable to track the growing and/or supply chain data over time in the data structure, and wherein the selected forecasting model comprises casual product demand forecasting.

17. The system of claim 13, wherein the one or more growing environment conditions comprise one or more selected from a group consisting of: ambient temperature, ambient humidity, ambient carbon dioxide concentration, soil temperature, soil moisture level, and soil pH level.

* * * * *